Patented Apr. 14, 1931

1,800,319

UNITED STATES PATENT OFFICE

KOLOMAN ROKA, OF KONSTANZ, AND OTTO FUCHS, OF WOLLMATINGEN, NEAR KONSTANZ, GERMANY, ASSIGNORS, BY MESNE ASSIGNMENTS, TO THE FIRM OF DEUTSCHE GOLD-UND-SILBER SCHEIDEANSTALT VORMALS ROESSLER, OF FRANKFORT-ON-THE-MAIN, GERMANY, A CORPORATION OF GERMANY

METHOD FOR MAKING ESTERS

No Drawing. Application filed October 25, 1927, Serial No. 228,684, and in Germany November 15, 1926.

This invention relates to a method for making esters of the lower members of the fatty acid series.

It is known to make fatty acid esters by distilling mixtures of fatty acids and alcohols in presence of catalysts, especially mineral acids.

According to our invention fatty acids such as acetic acid, propionic acid and the like may be esterified with alcohols without catalysts such as mineral acids being present, when the reaction is carried through at temperatures above 100° C., for example, between 150 and 200° C., preferably under raised pressure. The produced esters are continuously removed, for example, by distillation from the reaction mixture. As the reaction is carried through in a liquid system, the upper temperature limit is given by the critical temperature of the system. One may, therefore, also operate for example at temperatures up to 250° C. and above, in the presence of pressures of 50 atmospheres and more. All those fatty acids, which are stable and the esters of which may be distilled off at the temperatures mentioned above, may be used as starting material in our process. The components for the reaction may be present in molecular proportions; it is however also possible that an excess of one component may be present in the reaction mixture.

It was not to be expected that this method would give such excellent results, as we have obtained, because one knows by physico-chemical measurements, that raised temperatures of, for example, 60° C. do not have any favorable influence upon the equilibrium in the production of esters. The raised temperatures, which are employed in the method according to our invention, have even an unfavorable influence upon the equilibrium. It is therefore the more surprising that the esterification is so favorably influenced by the steps of our method that we can eliminate the use of mineral acids or other catalysts.

The invention is not limited to the use of concentrated fatty acids and alcohols for very diluted raw materials such, for example, as raw pyroligneous acid also may be esterified with excellent results according to our invention.

Since, according to the process of the present invention, as the following examples will show, it is possible to transform all but 2 to 6% of the pure acid of the starting solution into ester, it follows that, by using a starting solution of 10% acid concentration, the production of ester (conversion of acid) will be between 98% and 94% of that of the theoretical output.

By our new method we not only obtain excellent yields of esters, but we also avoid the disadvantages of the known esterification methods, one of which disadvantages is the corrosion of the stills by the mineral acids. We also avoid the many by-reactions due to the presence of mineral acids. If diluted raw materials are to be esterified one has, when working according to the known methods, to add a comparatively great amount of mineral acid; this disadvantage, which is avoided by our method, made the former methods comparatively expensive, not only because of the cost of these acids but also because strongly acid waste solutions had to be removed in the plant.

*Examples*

1. 1200 parts of a 10% acetic acid and 320 parts of methyl alcohol are heated in a pressure vessel to 150–155° C. at a pressure of 8–9 atmospheres. The ester is distilled off in the same measure as it is produced through a column mounted upon the pressure vessel. The vapors from the column pass a pressure reduction valve on the top of the same and enter a cooler, where they are condensed. The esterification of the last parts of acetic acid may be accelerated by a moderate increase in temperature and pressure. The aqueous residue contains 0,2–0,6% of acetic acid dependent upon the speed of distilling off.

Since there were 10 parts of pure acid in every 100 parts of starting solution and 0.2 to 0.6 parts of pure acid in each 100 parts of the remaining solution, it results that, (multiplying each by 10), there are 2 to 6 parts of pure acid left out of every 100 parts of pure acid contained in the starting solution. Therefore, 98 to 94 parts out of every 100 of pure acid have been distilled off, and the resulting efficiency lies between 94% and 98%.

2. Preheated aqueous acetic acid is introduced into a pressure column preferably on a plate in about two thirds of the total height of the column; the amount of methyl alcohol necessary for the esterification is preferably distributed on several plates below that plate. The acid is quickly and completely esterified at a temperature of 160° C. and a pressure of 10 atmospheres. The distillate obtained from the top of the column contains 60–65% methyl acetate and the waste solution contains only about 0,5% acetic acid.

We claim:

1. The method for making esters of the lower members of the fatty acid series comprising the steps of reacting mixtures of fatty acids and aliphatic monohydroxy alcohols at temperatures between 100° C. and 250° C. and at pressures sufficiently high to maintain the mixtures in the liquid phase, and continuously removing the esters produced from the reaction mixture.

2. The method for making esters of the lower members of the fatty acid series comprising the steps of reacting mixtures of fatty acids and aliphatic monohydoxy alcohols at temperatures between 150 and 200° C. and at pressures sufficiently high to maintain the mixtures in the liquid phase, and continuously removing the esters produced from the reaction mixture.

3. The method for making esters of the lower members of the fatty acid series comprising the steps of reacting mixtures of fatty acids and aliphatic monohydroxy alcohols at temperatures between 150 and 200° C. and at pressures sufficiently high to maintain the mixtures in the liquid phase, and continuously distilling off the vapors produced.

4. The method for making methyl acetate comprising the steps of reacting mixtures of acetic acid and methyl alcohol at temperatures between 100° C. and 250° C. and at pressures sufficiently high to maintain the mixtures in the liquid phase, and continuously distilling off the vapors produced.

5. The method for making methyl acetate comprising the steps of reacting mixtures of acetic acid and methyl alcohol at pressures between 6 and 15 atmospheres and at temperatures between 130° and 200° C. and continuously distilling off the vapors produced.

6. The method for making methyl acetate according to claim 4 in which diluted acetic acid is used as starting material.

7. The method for making methyl acetate according to claim 4 in which raw pyroligneous acid is used as starting material.

In testimony whereof we affix our signatures.

KOLOMAN ROKA.
OTTO FUCHS.